(12) United States Patent
Diehl et al.

(10) Patent No.: US 9,963,125 B2
(45) Date of Patent: May 8, 2018

(54) STEERING WHEEL MOUNTED TRAILER BRAKE CONTROLLERS AND SYSTEMS

(71) Applicant: FORD GLOBAL TECHNOLOGIES, LLC, Dearborn, MI (US)

(72) Inventors: Cary Ochen Diehl, Grosse Ile, MI (US); Russell Allan Sims, Grosse Ile, MI (US)

( * ) Notice: Subject to any disclaimer, the term of this patent is extended or adjusted under 35 U.S.C. 154(b) by 0 days. days.

(21) Appl. No.: 15/139,759

(22) Filed: Apr. 27, 2016

(65) Prior Publication Data

US 2016/0236659 A1    Aug. 18, 2016

Related U.S. Application Data

(63) Continuation of application No. 14/248,078, filed on Apr. 8, 2014, now Pat. No. 9,346,439.

(51) Int. Cl.
   *B60T 7/08* (2006.01)
   *B60T 7/10* (2006.01)
   (Continued)

(52) U.S. Cl.
   CPC .............. *B60T 7/102* (2013.01); *B60T 7/085* (2013.01); *B60T 7/20* (2013.01); *B60T 8/1708* (2013.01);
   (Continued)

(58) Field of Classification Search
   CPC . B60T 7/102; B60T 7/20; B60T 7/085; B60T 8/1708; B62D 1/046;
   (Continued)

(56) References Cited

U.S. PATENT DOCUMENTS

| 2,082,430 A | | 6/1937 | Townsend | |
|---|---|---|---|---|
| 2,233,192 A | * | 2/1941 | Armington | ............ B62D 11/08 137/625.46 |

(Continued)

FOREIGN PATENT DOCUMENTS

| CN | 2136778 U | 6/1993 |
|---|---|---|
| CN | 2846241 U | 12/2006 |

(Continued)

OTHER PUBLICATIONS

Notice of Allowance dated Jan. 30, 2017 from co-pending U.S. Appl. No. 29/487,428.

(Continued)

*Primary Examiner* — Thomas J Williams
(74) *Attorney, Agent, or Firm* — Jones Robb, PLLC; Franklin Mackenzie

(57) ABSTRACT

A trailer brake controller for a motor vehicle may include a control unit configured to be mounted behind a spoke of a steering wheel of the vehicle, and a brake lever coupled to the control unit and extending along the control unit such that, when the control unit is mounted behind the spoke of the steering wheel, the brake lever extends above and/or below the spoke in a direction substantially perpendicular to the spoke. The brake lever may be configured to transmit a force applied to the lever by the driver to the control unit. The control unit may be configured to generate a manual trailer brake control signal based on the force applied to the lever.

19 Claims, 11 Drawing Sheets

(51) Int. Cl.
*B62D 1/04* (2006.01)
*B60T 7/20* (2006.01)
*B60T 8/17* (2006.01)

(52) U.S. Cl.
CPC ......... *B62D 1/046* (2013.01); *Y10T 74/20372* (2015.01); *Y10T 74/20396* (2015.01)

(58) Field of Classification Search
CPC ......... Y10T 74/20384; Y10T 74/20372; Y10T 74/20396
See application file for complete search history.

(56) References Cited

U.S. PATENT DOCUMENTS

| | | | |
|---|---|---|---|
| 2,539,994 A * | 1/1951 | Engler | B60T 13/48 |
| | | | 188/106 R |
| 3,532,188 A | 10/1970 | Kelz | |
| 3,592,280 A | 7/1971 | Wappler et al. | |
| 4,217,792 A | 8/1980 | Kesling | |
| 5,603,674 A | 2/1997 | Rivas et al. | |
| 5,785,393 A | 7/1998 | McGrath et al. | |
| 6,050,649 A | 4/2000 | Hensley | |
| 6,167,775 B1 | 1/2001 | Sebazco | |
| 6,179,390 B1 | 1/2001 | Guzorek et al. | |
| 6,371,572 B1 | 4/2002 | Frank | |
| 6,609,768 B1 | 8/2003 | Frank | |
| 6,655,703 B1 | 12/2003 | Spears, Jr. | |
| 6,966,613 B2 | 11/2005 | Davis | |
| 7,278,510 B1 * | 10/2007 | Richards | B62D 1/046 |
| | | | 180/336 |
| D564,974 S | 3/2008 | Berg | |
| D606,914 S | 12/2009 | Pohanka | |
| 8,067,709 B2 | 11/2011 | Han et al. | |
| 8,140,235 B2 | 3/2012 | Simmerman | |
| 8,438,943 B2 * | 5/2013 | Herbert | F16H 59/02 |
| | | | 180/336 |
| 8,511,759 B2 | 8/2013 | Marsden et al. | |
| 9,308,930 B2 | 4/2016 | Bostick et al. | |
| D787,391 S * | 5/2017 | Sims | D12/177 |
| 2002/0104705 A1 | 8/2002 | Kuhn, Jr. | |
| 2003/0160412 A1 * | 8/2003 | Constans | B60T 7/10 |
| | | | 280/88 |
| 2004/0084291 A1 | 5/2004 | Adachi et al. | |
| 2004/0099468 A1 * | 5/2004 | Chernoff | B60T 7/085 |
| | | | 180/409 |
| 2005/0247549 A1 | 11/2005 | Wahl et al. | |
| 2006/0079372 A1 | 4/2006 | Ringger et al. | |
| 2007/0001509 A1 | 1/2007 | Brown et al. | |
| 2008/0023253 A1 | 1/2008 | Prost-Fin et al. | |
| 2014/0022070 A1 | 1/2014 | Golomb | |
| 2014/0224600 A1 | 8/2014 | Rosenbaum | |
| 2015/0066322 A1 * | 3/2015 | Squire | B60T 17/22 |
| | | | 701/70 |
| 2015/0283982 A1 | 10/2015 | Diehl et al. | |

FOREIGN PATENT DOCUMENTS

| | | | |
|---|---|---|---|
| DE | 3708094 C1 * | 9/1988 | ............ B60R 16/00 |
| JP | 05270410 A * | 10/1993 | |

OTHER PUBLICATIONS

Notice of Allowance dated Jan. 5, 2017 from co-pending U.S. Appl. No. 29/487,425.
Advisory Action dated Jun. 30, 2016 from co-pending U.S. Appl. No. 29/487,425.
Non-Final Office Action dated Aug. 16, 2016 from co-pending U.S. Appl. No. 29/487,425.
Non-Final Office Action dated Oct. 5, 2015 from co-pending U.S. Appl. No. 29/487,425.
Final Office Action dated Mar. 25, 2016 from co-pending U.S. Appl. No. 29/487,425.
Machine translation of CN2136778U, original document dated Jun. 23, 1993.
Machine translation of CN2846241U, original document dated Dec. 13, 2006.
Russell Allan Sims et al., "Steering Wheel Mounted Brake Controller", Design U.S. Appl. No. 29/487,425, filed Apr. 8, 2014.
Russell Allan Sims et al., "Brake Controller", Design U.S. Appl. No. 291487,428, filed Apr. 8, 2014.
Office Action from related U.S. Appl. No. 14/248,078, dated Jun. 6, 2015.
Office Action from related U.S. Appl. No. 14/248,078, dated Oct. 19, 2015.
Notice of Allowance from related U.S. Appl. No. 14/248,078, dated Jan. 20, 2016.

* cited by examiner

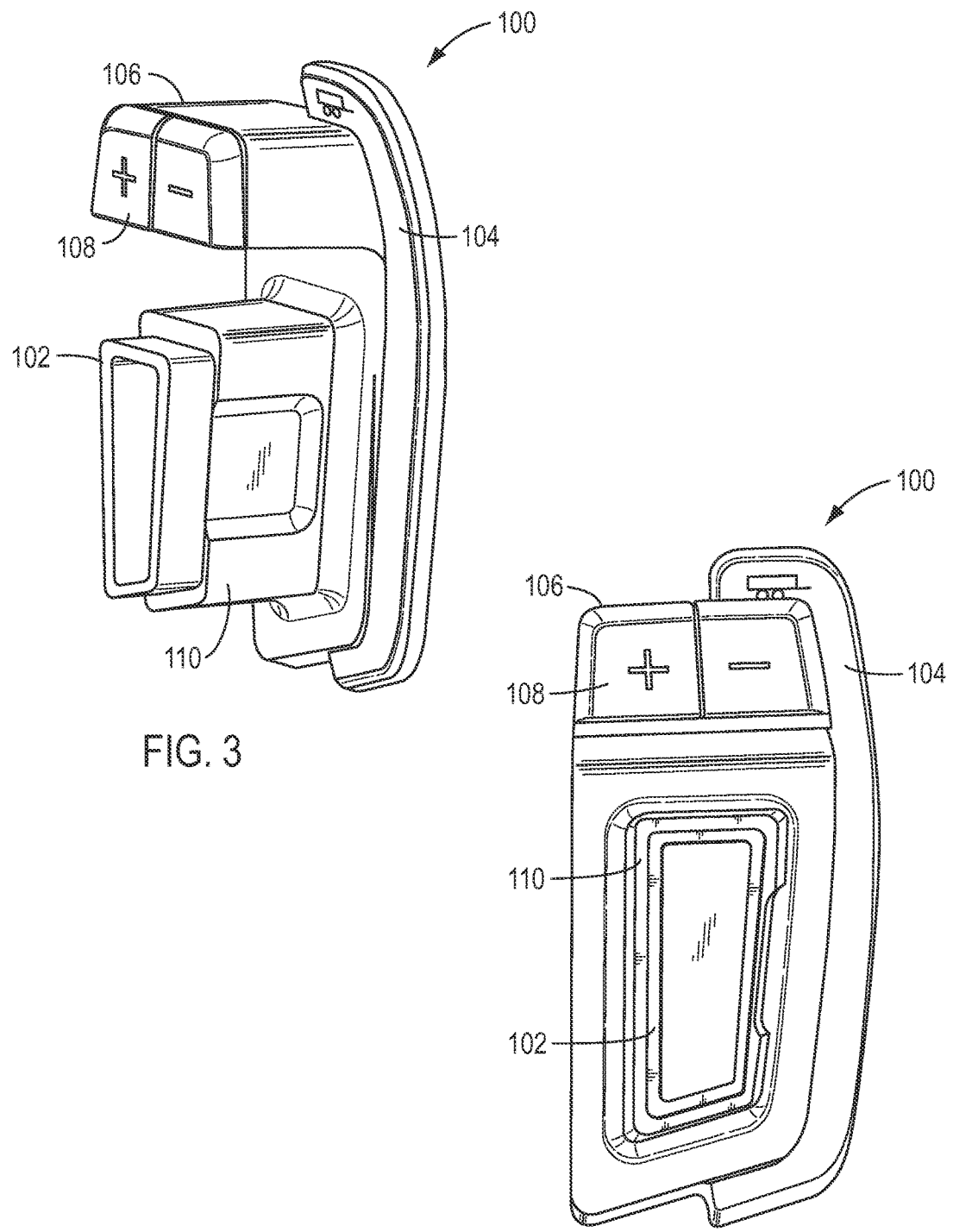

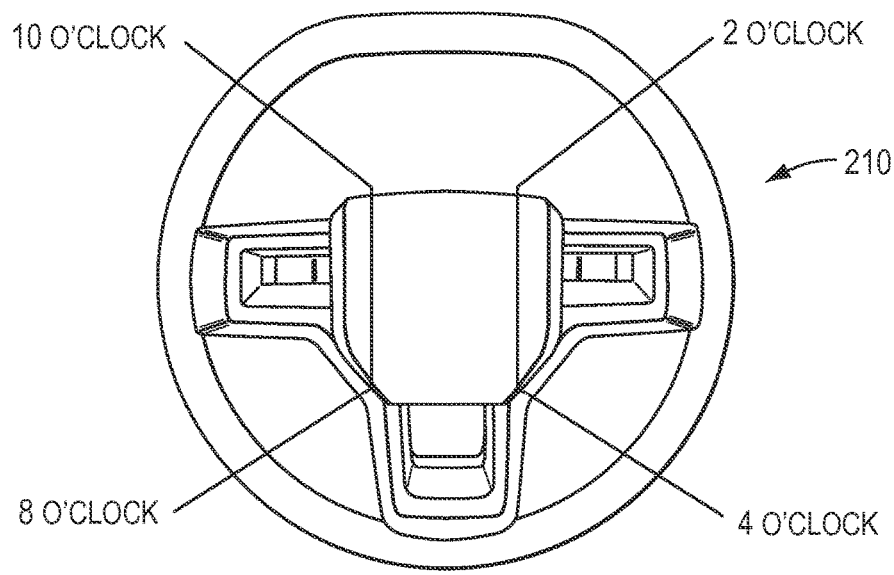
FIG. 13
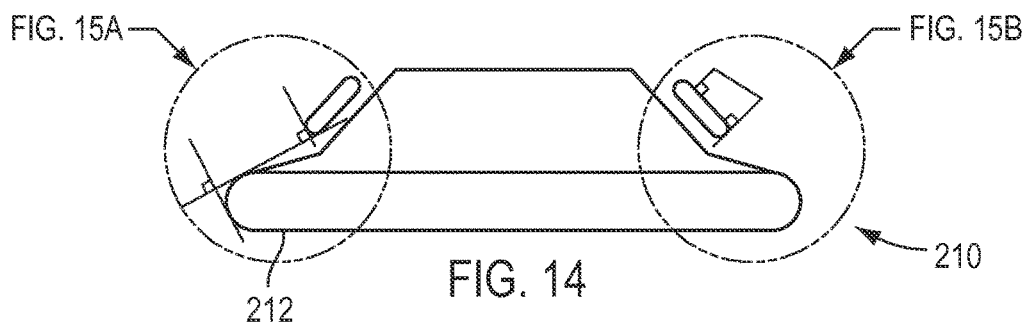
FIG. 14
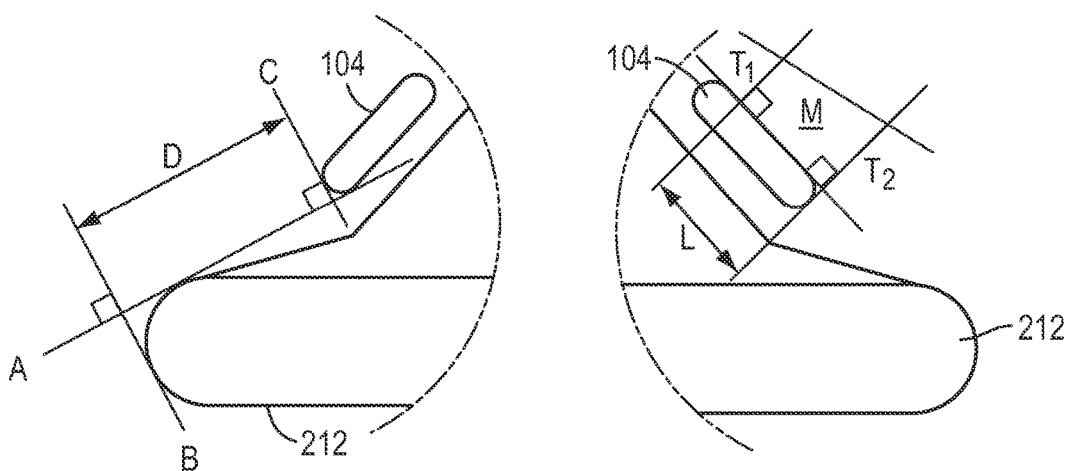
FIG. 15A
FIG. 15B

STEERING WHEEL MOUNTED TRAILER BRAKE CONTROLLERS AND SYSTEMS

CROSS REFERENCE TO RELATED APPLICATIONS

This application is a continuation of U.S. patent application Ser. No. 14/248,078 (filed Apr. 8, 2014; now U.S. Pat. No. 9,346,439), the entire contents of which are incorporated by reference herein. This application is related to U.S. Design patent application No. 29/487,428 (filed Apr. 8, 2014; now U.S. Pat. No. D789,898); and to U.S. Design patent application No. 29/487,425 (filed Apr. 8, 2014; now U.S. Pat. No. D787,391), the entire contents of each of which are incorporated by reference herein.

TECHNICAL FIELD

The present disclosure relates generally to brake controllers and systems for manually controlling the electronic brakes of a towed vehicle, such as a trailer. More specifically, the present disclosure relates to steering wheel mounted trailer brake controllers and systems.

BACKGROUND

Passenger vehicles commonly control the brakes of a vehicle that is being towed by the passenger vehicle, such as, for example, a trailer, through the use of a trailer brake controller that is generally located within the passenger vehicle. Trailers are commonly equipped, for example, with electronically actuated trailer brakes. A trailer brake controller utilizes a brake input signal in combination with a driver set gain to generate a brake control signal that is transmitted to the electronically actuated trailer brakes, which in turn generate a braking torque on the trailer wheels. Such breaking systems may, for example, translate vehicle input (i.e., from the passenger vehicle), such as brake pedal force or position, brake pressure or vehicle acceleration, into the brake control signal, which is adjustable according to the driver set gain, to brake the trailer.

To allow independent application of the trailer brakes (i.e., without application of the brakes of the passenger vehicle), for example, during an emergency situation such as fishtailing of the trailer, trailer brake controllers also may manually actuate the trailer brakes via a manual brake input signal. As illustrated in FIGS. 1 and 2, for example, conventional trailer brake controllers (e.g., controller 1) are generally located within reach of the steering wheel in an instrument panel of the dashboard of the vehicle, and include a manual override switch (e.g., switch 10) that allows the driver to control the trailer brakes independently of the vehicle brakes. Such controllers, therefore, require a driver to keep one hand on the steering wheel of the vehicle, while moving the other hand to the trigger-like mechanism on the controller to manually actuate the trailer brakes. Such action by the driver is not a normal or instinctive reaction to an emergency situation such as fishtailing, to which a driver instinctively keeps both hands on the steering wheel in an effort to overcome the fishtailing event.

In an effort to provide a more rapid and intuitive application of the trailer brakes in such situations (i.e., during emergency situations), various trailer brake controllers have been proposed, which position the controller closer to the steering wheel and/or incorporate, for example, a secondary controller (i.e., that is meant to be used in emergency situations in conjunction with a primary trailer brake controller located in the dashboard) into the rim of the steering wheel itself. Such controllers, however, still require the driver to either remove one hand from the steering wheel to actuate the controller, or present additional complications which may interfere with the trailer's correction.

For example, when a trailer brake controller is incorporated with the rim of a steering wheel and actuated via a force applied to the steering wheel, the trailer brakes may be inadvertently actuated, or inappropriately actuated, when the driver grips the steering wheel. As above, during an emergency situation such as fishtailing, a driver will generally instinctively keep both hands on the steering wheel in an effort to overcome the fishtailing, and while doing so will generally also grip the steering wheel in a more forceful manner. If the trailer brakes may be actuated by such instinctive gripping, the brakes may be misapplied, which may not only delay correction of the fishtailing but make the situation worse.

It may, therefore, be advantageous to provide trailer brake controllers, systems, and methods that do not require a driver to remove a hand from the steering wheel to manually actuate the controller. It may be further advantageous to provide a trailer brake controller that is ergonomically located within a fingers reach of the steering wheel to provide rapid, intuitive, and accurate application of a trailer's brakes, without interfering with the driver's normal use of the steering wheel.

SUMMARY

In accordance with various embodiments of the present disclosure, a trailer brake controller for a motor vehicle may include a control unit configured to be mounted behind a spoke of a steering wheel of the vehicle, and a brake lever coupled to the control unit and extending along the control unit such that, when the control unit is mounted behind the spoke of the steering wheel, the brake lever extends above and/or below the spoke in a direction substantially perpendicular to the spoke. The brake lever is configured to transmit a force applied to the lever by the driver to the control unit. The control unit is configured to generate a manual trailer brake control signal based on the force applied to the lever.

In accordance with various additional embodiments of the present disclosure, a trailer brake control system for a motor vehicle may include a steering wheel comprising a rim and at least one spoke, the rim and the at least one spoke defining an open area of the steering wheel, and at least one control unit mounted behind the at least one spoke. The trailer brake control system may further include a brake lever coupled to the at least one control unit and extending above and/or below the at least one spoke to be at least partially visible to a driver of the vehicle through the open area of the steering wheel. The at least one control unit is configured to generate a manual trailer brake control signal based on a force applied to the lever by the driver to actuate electronic wheel brakes of a vehicle being towed by the vehicle.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 3 is a perspective view of an exemplary embodiment of a trailer brake controller in accordance with the present disclosure;

FIG. 4 is a front view of the trailer brake controller of FIG. 3;

FIG. 13 is a front, plan view of a steering wheel illustrating exemplary areas for placement of a brake lever with relation to the steering wheel;

FIG. 14 is a top, plan view of a steering wheel illustrating exemplary positioning for placement of a brake lever with relation to the steering wheel;

FIGS. 15A and 15B show detailed views of the brake lever placement of FIG. 14;

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In accordance with various exemplary embodiments, the present disclosure contemplates a trailer brake controller for a motor vehicle that is mounted to a steering wheel of the vehicle and operated, for example, by a driver's finger. For instance, the embodiments described herein contemplate a trailer brake controller that is ergonomically located within a finger's reach of a rim of the steering wheel, thereby allowing the driver to actuate the controller with his or her finger without removing his or her hand from the steering wheel. Various embodiments described herein, for example, contemplate a trailer brake controller comprising a control unit that is configured to be mounted to a spoke of the steering wheel, and a brake lever that is coupled to the control unit and which extends along a longitudinal axis of the control unit. In this manner, when mounted to the steering wheel, a driver may intuitively operate the trailer brakes by pulling the brake lever in a forward motion (i.e., toward the driver and away from the dashboard of the vehicle), using a natural movement that is similar to the application of a bicycle's brakes.

Figure 1:
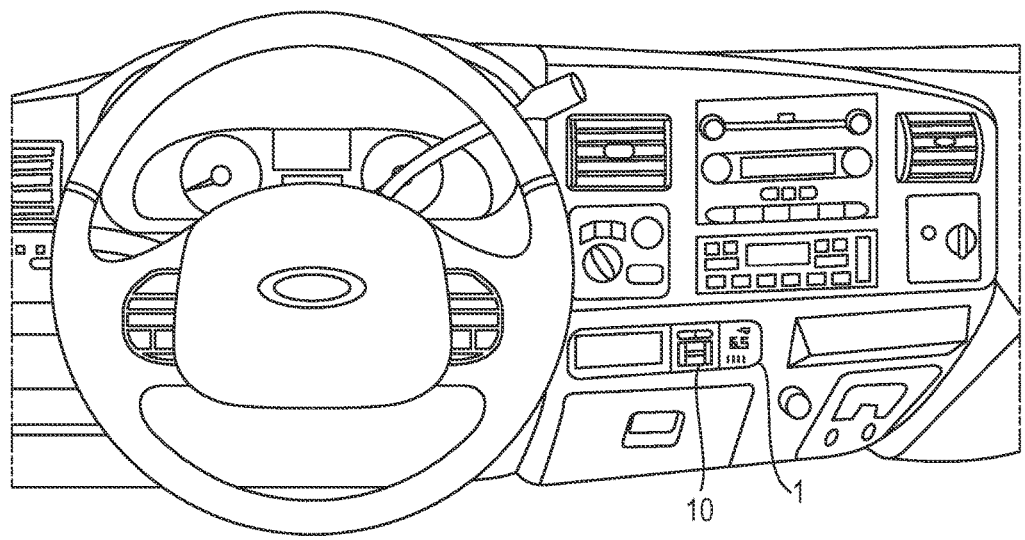
FIG. 1 is a perspective view of a dashboard of a motor vehicle with a conventional trailer brake controller.
Figure 2:
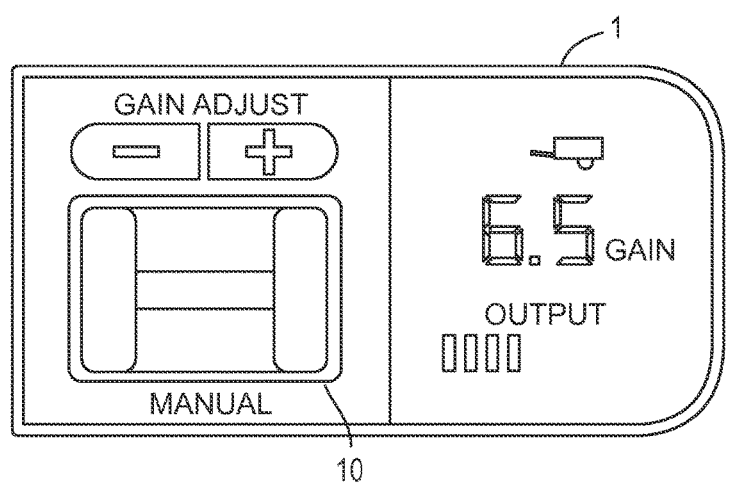
FIG. 2 is an enlarged view of the conventional trailer brake controller of FIG. 1.
Figure 5:
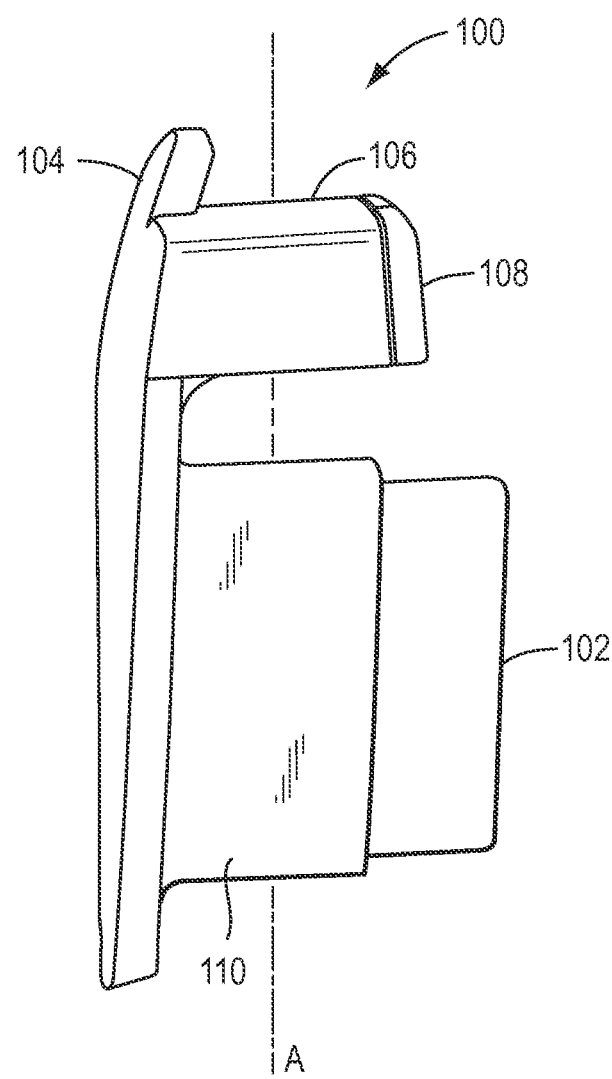
FIG. 5 is a side view of the trailer brake controller of FIG. 3.

FIGS. 3-5 illustrate an exemplary embodiment of a trailer brake controller 100 in accordance with the present disclosure. The trailer brake controller 100 includes a control unit 102 that is configured to be mounted to a steering wheel of a motor vehicle, and a brake lever 104 that is coupled to the control unit 102. As shown best perhaps in FIG. 5, the brake lever 104 extends along a longitudinal axis A of the control unit 102 and is configured to move with relation to the control unit 102 when a force is applied to the brake lever 104. In various embodiments, when the control unit 102 is in a mounted position within a vehicle (see FIGS. 6-9), the brake lever 104 is configured to be actuated by a driver of the motor vehicle by being pulled in a forward motion F toward the driver, as illustrated in FIG. 7.

The brake lever 104 may be actuated, for example, via a standard electrical switch mechanism as would be understood by those of ordinary skill in the art. In various embodiments, for example, the brake lever 104 may being actuated via a variable, push-button type switch mechanism, in which the entire brake lever 104 is configured to translate forward in a direction substantially perpendicular to the longitudinal axis A of the control unit 102. In various exemplary embodiments, as illustrated in the embodiment of FIGS. 3-9, the brake lever 104 may include a housing 110 which may at least partially enclose the control unit 102 and slide forward with relation to the control unit 102 (i.e., over the control unit 102) to transmit the applied force to the control unit 102 when the brake lever 104 is pulled in the forward motion F (see FIG. 7).

Figure 10:
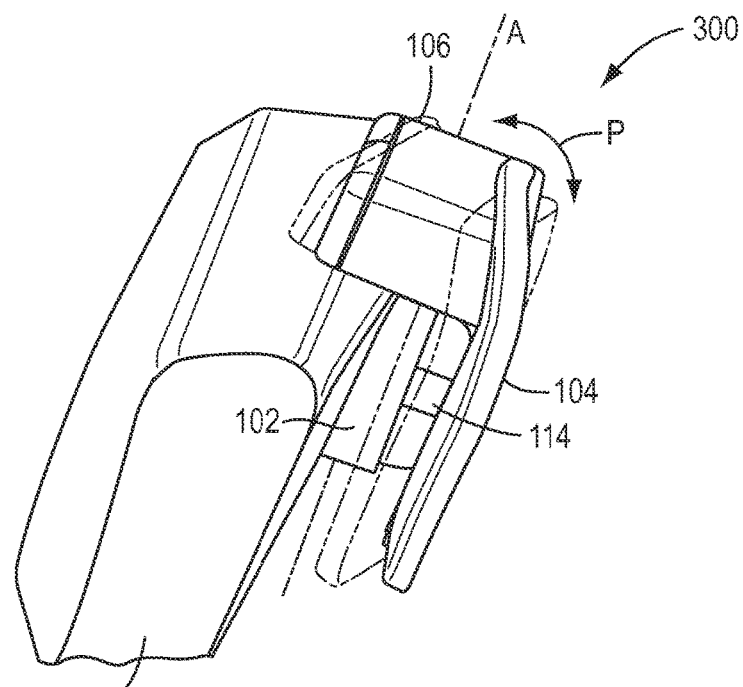
FIG. 10 is a side view of another exemplary embodiment of a trailer brake controller in accordance with the present disclosure mounted to a spoke of a steering wheel.
Figure 11:
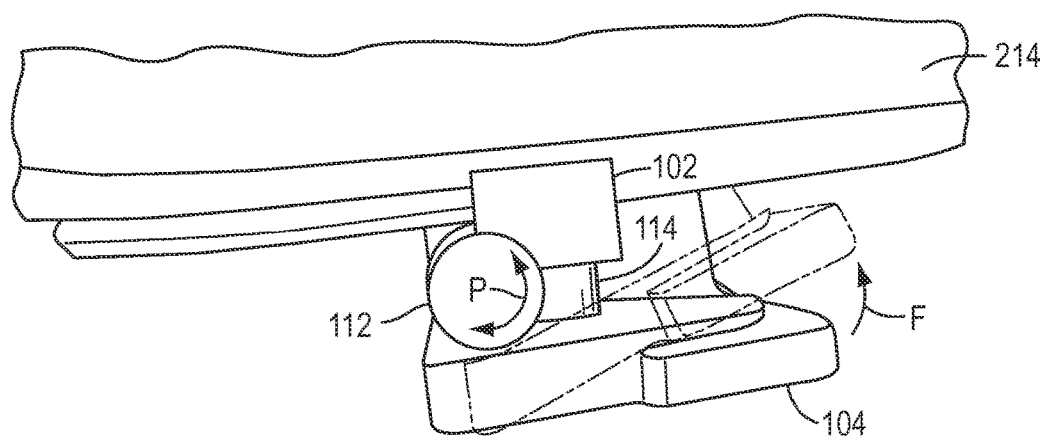
FIG. 11 is a bottom view of the trailer brake controller of FIG. 10.

In various additional exemplary embodiments, as illustrated in the embodiment of FIGS. 10 and 11, a trailer brake controller 300 may include a brake lever 104 that is actuated via a variable, pivot switch mechanism in which the entire brake lever 104 is configured to pivot forward via a pivot P in a direction substantially perpendicular to a longitudinal axis A of a control unit 102. In such embodiments, the brake lever 104 may include, for example, a hinge 112 and an actuator 114, and the brake lever 104 may transmit the applied force to the control unit 102 via compression of the actuator 112 as the lever 104 pivots in a forward motion F on the hinge 112.

In this manner, the driver of the vehicle may actuate the brake lever 104 with one or more fingers, using a quick finger pull (i.e., without requiring the driver to remove his or her hand from the steering wheel) to engage the switch mechanism, which transmits the driver's applied force to the control unit 102. In various embodiments, for example, the brake lever 104 may be actuated by a relatively minor force applied to the lever 104, such as, for example, a force ranging from about 1 N to about 15 N. In accordance with various embodiments of the present disclosure, the control unit 102 is then configured to generate a manual trailer brake control signal based on the applied force to actuate electronic wheel brakes of a vehicle being towed by the motor vehicle (e.g., a trailer).

As above, to allow independent application of the trailer's brakes (i.e., without application of the vehicle's brakes), for example, during an emergency situation such as fishtailing of the trailer, a driver may use a trailer brake controller to manually control the trailer brakes via a signal generated by the trailer brake controller. Accordingly, as used herein, the term "manual trailer brake control signal" refers to an output signal generated by the trailer brake controller that is used to manually actuate the trailer brakes. In other words, the manual trailer brake control signal is generated based on manual driver input (i.e., via an applied force) from the driver of the vehicle, and may be varied, for example, based on the driver's input (i.e., the amount of force applied).

In contrast, as used herein, the term "automatic trailer brake control signal" refers to an output signal that is also generated, for example, by a trailer brake controller (e.g., a primary trailer brake controller that is integrated into the vehicle's braking system) that is used to automatically actuate the trailer brakes whenever the vehicle's brakes are actuated. In other words, the automatic trailer brake control signal is generated based on vehicle input, such as brake pedal force or position, brake pressure or vehicle acceleration, and is adjustable according to the driver set gain. Such trailer brake controllers, which are integrated into a passenger vehicle's braking system, and the methods used by such controllers to automatically control trailer brake systems are disclosed, for example, in U.S. Pat. No. 8,511,759 B2 to Marsden et al., dated Aug. 20, 2013, the entire content of which is incorporated by reference herein.

The present disclosure, therefore, contemplates a trailer brake controller that may function as a secondary controller, in conjunction with a vehicle's primary trailer brake controller, such as, for example, a trailer brake controller as disclosed in U.S. Pat. No. 8,511,759 B2, which a driver may use to manually override control of the trailer brakes (e.g., during an emergency situation). In various embodiments, for example, the trailer brake controller 100, 300 is configured to transmit a manual trailer brake control signal (which is configured to override the automatic trailer brake control signal) via a digital or other electrical type signal to the primary trailer brake controller, which, in turn, is configured to send a signal to actuate the electronic wheel brakes of the vehicle being towed (e.g., the trailer).

The present disclosure further contemplates a trailer brake controller that may also function as the primary trailer brake controller (i.e. in addition to providing manual control of the trailer brakes), using, for example, the methods of controlling a trailer brake system as disclosed in U.S. Pat. No. 8,511,759 B2. In various embodiments, for example, the trailer brake controller 100, 300 is further configured to receive braking inputs from at least one brake pressure sensor (not shown) associated with a braking system (not shown) of the vehicle and develop an automatic trailer brake control signal based on the braking inputs to actuate the electronic wheel brakes of the trailer. In various additional embodiments, to improve the performance of the trailer brake controller 100, 300, the trailer brake controller 100, 300 may be further configured to receive signals relating to a velocity of the motor vehicle, and may adjust the automatic trailer brake control signal based on the velocity, as disclosed in detail in U.S. Pat. No. 8,511,759 B2. In such embodiments, the trailer brake controller 100, 300 is configured to send either an automatic trailer brake control signal or a manual trailer brake control signal to actuate the electronic wheel brakes of the trailer. It would be understood, for example, that the manual trailer brake control signal is still configured to override the automatic trailer brake control signal.

As would be understood by those of ordinary skill in the art, the control unit 102 may transmit a manual trailer brake control signal via any technique, cabled or wireless, known to those of ordinary skill in the art, including, for example, via an antenna (not shown) located within the control unit 102.

Those of ordinary skill in the art would understand that the trailer brake controllers 100 and 300 described above with reference to the embodiments of FIGS. 3-9 and 10 and 11 are exemplary only and that trailer brake controllers in accordance with the present disclosure may have various configurations, including various control units 102 and brake levers 104 having various configurations (i.e., shapes and/or cross-sections), lengths, and/or dimensions, which are actuated via various mechanisms using various amounts of driver applied force, without departing from the scope of the present disclosure and claims.

In various embodiments, for example, trailer brake controllers (e.g., trailer brake controllers 100, 300) may also include a gain input control 106 that is coupled to the brake lever 104. The gain input control 106 may comprise a +/− gain adjustment that is controlled, for example, via a control push surface 108. In various embodiments, for example, the gain input control 106 may be coupled to a top portion of the brake lever 104, such that the gain input control 106 is visible to a driver of the vehicle when the controller is mounted to the steering wheel, and is configured to move with the brake lever 104. As would be understood by those of ordinary skill in the art, the gain adjustment allows a driver of the motor vehicle (in which the controller is located) to set a gain, which adjusts the amount of braking force that the trailer brakes will provide based on the electronic signal provided by the trailer brake controller.

As would be further understood by those of ordinary skill in the art, the gain input control 106 and the control push surface 108 may have various configurations based on the design of the trailer brake controller and the actuation mechanism employed by the trailer brake controller. Accordingly, the gain input control 106 and the control push surface 108 illustrated in FIGS. 3-11 is exemplary only, and is illustrated merely to demonstrate an exemplary manner in which a gain input control may be incorporated into a trailer brake controller that is configured to be mounted to a steering wheel.

Figure 12:
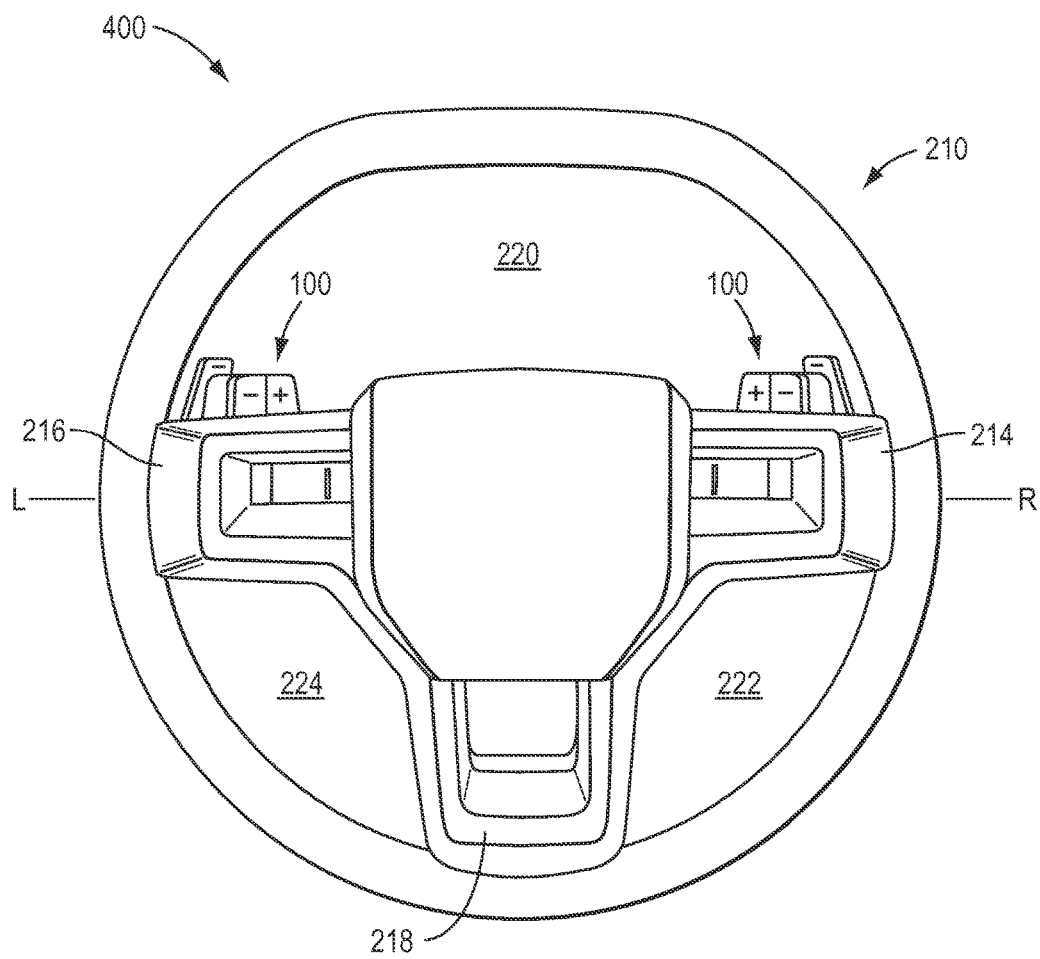
FIG. 12 is a front view of another exemplary embodiment of a trailer brake control system in accordance with the present disclosure.

As above, the present disclosure contemplates trailer brake controllers that are configured to be mounted to a steering wheel of a motor vehicle. Various additional embodiments of the present disclosure contemplate trailer brake control systems comprising one or more trailer brake controllers mounted to a steering wheel. FIGS. 6-9 illustrate, for example, a trailer brake control system 200 including a trailer brake controller 100 that is mounted to a steering wheel 210 of a motor vehicle (not shown). Similarly, FIG. 12 illustrates a trailer brake control system 400 including two trailer brake controllers 100 mounted on opposite sides of the steering wheel 210 from each other. The steering wheel 210 may include, for example, a rim 212 and at least one spoke, three spokes 214, 216, and 218 being shown in the exemplary embodiments of FIGS. 6-9 and 12, wherein the rim 212 and the spokes 214, 216, and 218 define open areas 220, 222, and 224 of the steering wheel 210.

Figure 6:
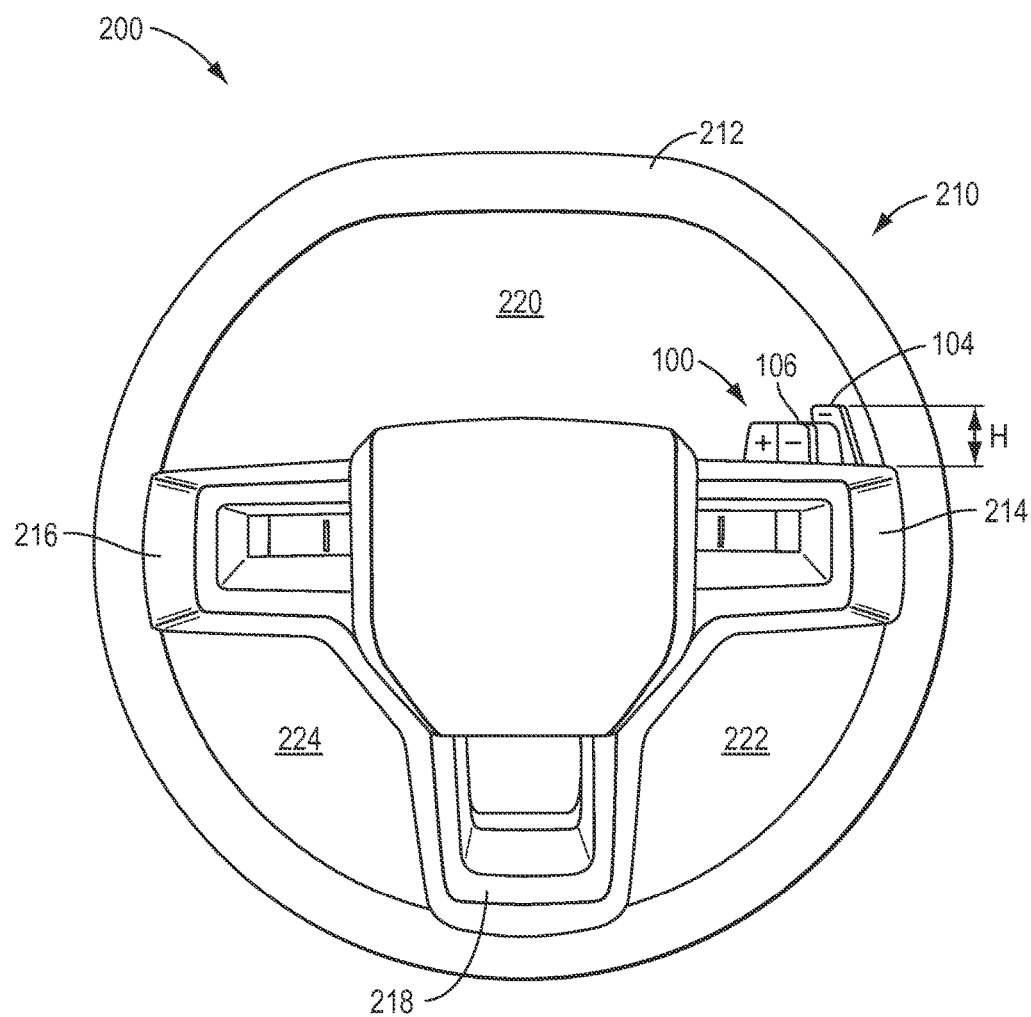
FIG. 6 is a front view of an exemplary embodiment of a trailer brake control system in accordance with the present disclosure, showing the trailer brake controller of FIG. 3 mounted to a spoke of a steering wheel of a motor vehicle.
Figure 7:
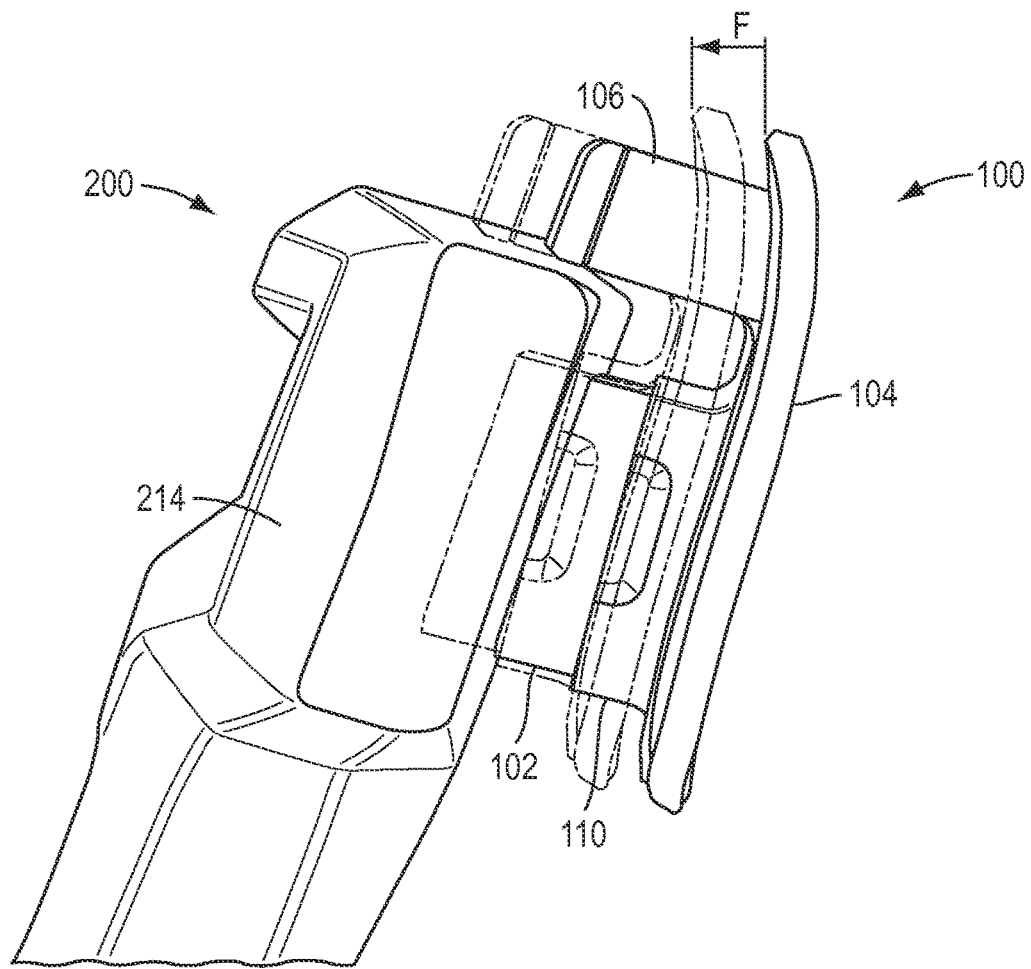
FIG. 7 is a partial, right side view of the trailer brake control system of FIG. 6.
Figure 8:
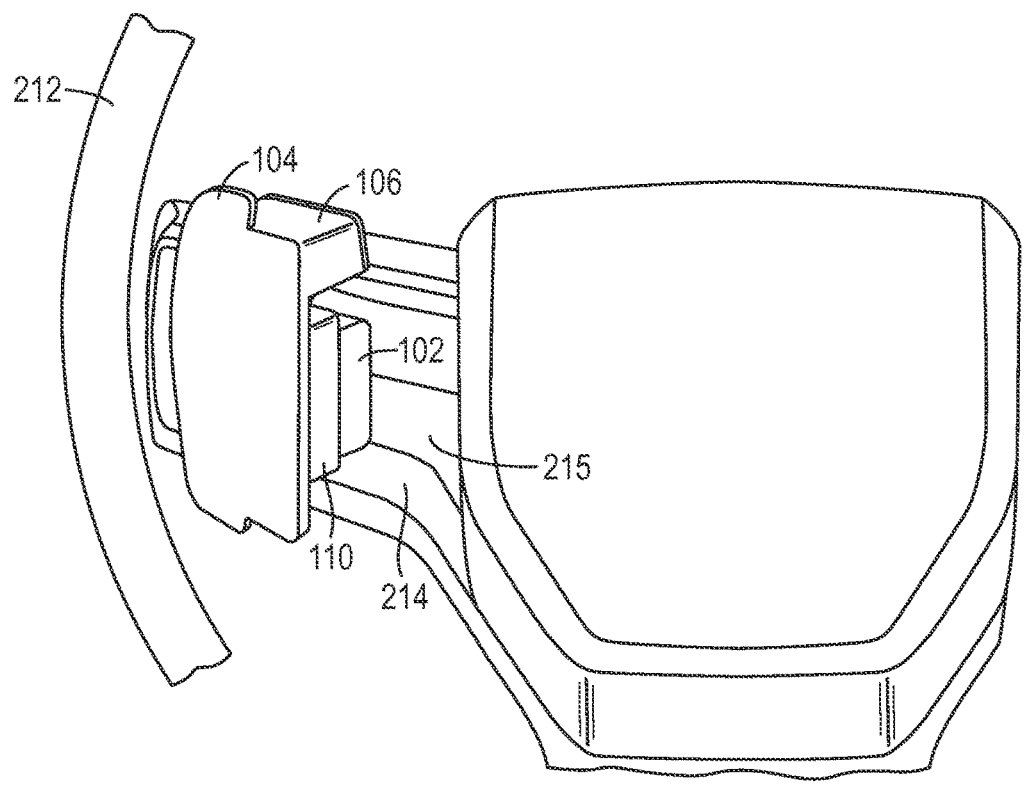
FIG. 8 is a partial, back view of the trailer brake control system of FIG. 6.
Figure 9:
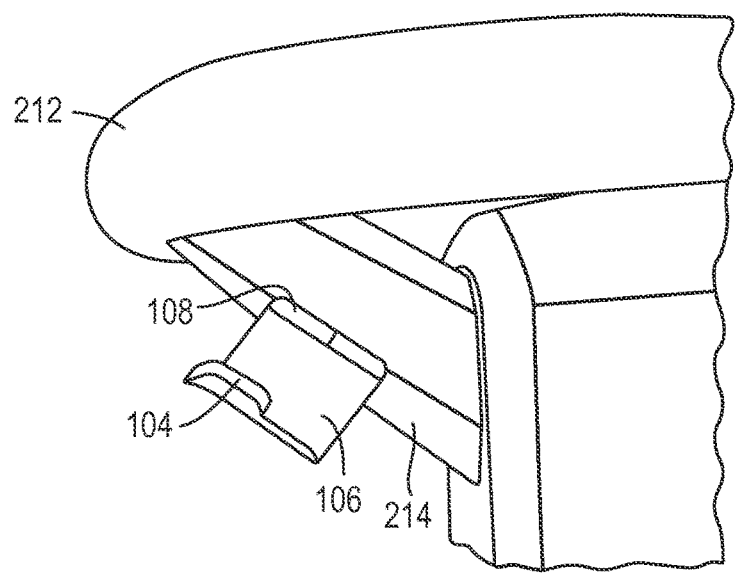
FIG. 9 is a partial top view of the trailer brake control system of FIG. 6.

As illustrated in FIGS. 6-9, in various exemplary embodiments, a control unit 102 of a trailer brake controller 100 may be mounted to a right hand side R of the steering wheel 210 behind the spoke 214 of the steering wheel 210, such that the brake lever 104 is at least partially visible to a driver of the vehicle through the open area 220. With reference to FIG. 6, for example, in various embodiments, the control unit 102 may be mounted to the spoke 214 such that the lever 104 extends above the spoke 214 by a height H of about 10 mm to about 50 mm. As shown best perhaps in FIG. 8, in various embodiments, the control unit 102 may be directly mounted to a back portion 215 of the spoke 214. In various additional embodiments, the control unit may be embedded within the back portion 215 of the spoke 214. In this manner, as described above, when a force is applied to the brake lever 104 (e.g., by a finger on a right hand of the driver), the brake lever 104 is configured to translate in a forward motion F toward the control unit 102 and the spoke 214 (i.e., toward the driver and away from the instrument panel of the vehicle).

As illustrated in FIG. 12, in various additional exemplary embodiments, a control unit 102 of a trailer brake controller 100 may be mounted to both the right hand side R and a left hand side L of the steering wheel 210 behind respective spokes 214 and 216 of the steering wheel 210 (i.e., behind spokes positioned on opposite sides of the steering wheel 210 from each other), such that a brake lever 104 of each of the controllers 100 is visible to the driver through the open area 220 and may be respectively actuated by the driver by being pulled in a forward motion F toward the driver.

Various embodiments of the present disclosure contemplate, for example, mounting one or more control units 102 to the spokes of the wheel 210 such that the controllers 100 are ergonomically positioned around the steering wheel 210. With reference to FIG. 13, in various exemplary embodiments, the control units 102 may be mounted such that the controllers 100 are positioned between a 2 O'clock and 4 O'clock position on the steering wheel 210 and/or a 10 O'clock and 8 O'clock position on the steering wheel 210.

With reference to FIGS. 14, 15A, and 15B, in various additional embodiments, so as not to interfere with the driver's normal grip of the steering wheel 210, the control units 102 may be mounted such that there is a distance D of about 65 mm to about 75 mm between a line C with respect to the lever 104 and a line B with respect to the rim 212 of the steering wheel 210. More specifically, line C is a line drawn perpendicular to a line A (i.e., a line drawn tangent to a forward edge of the rim 212 and rearward to an edge of the brake lever 104) and tangent to the edge of the brake lever 104. And, line B is a line drawn perpendicular to line A and tangent to an interior edge of the rim 212. As illustrated in FIG. 15B, the control units 102 may also be mounted such that a finger clearance area M (which represents an exemplary comfortable clearance area for a tip of a finger of a 95th percentile male) for activation of each lever 104 is defined by a thickness $T_1$ of about 20 mm, a thickness $T_2$ of about 25 mm, and a length L of about 35 mm. The finger clearance area M may ensure, for example, that there is sufficient space behind the lever 104 for the finger to actuate the lever 104 without bumping into turn signal stalks, wiper stalks, column shifters, and/or other controls that are mounted to the steering column of the vehicle.

Figure 16:
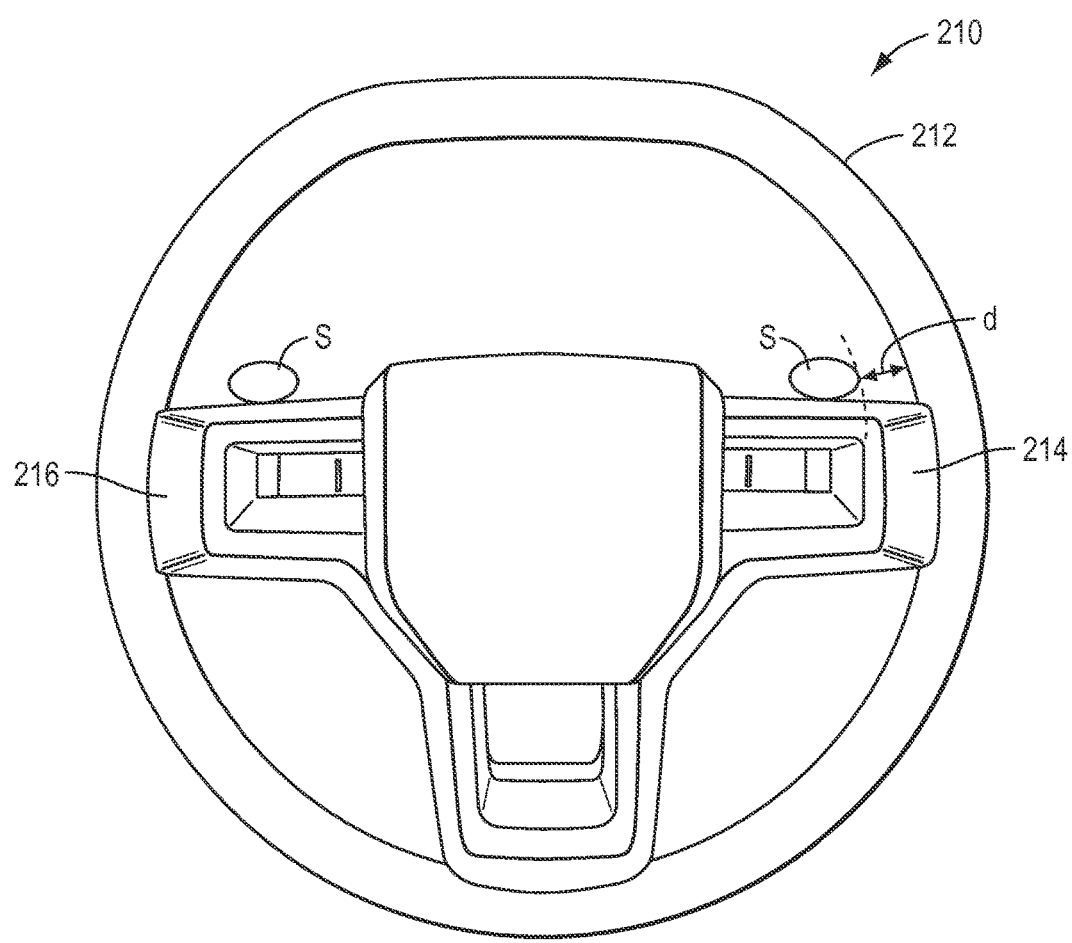
FIG. 16 is a front, plan view of a steering wheel illustrating exemplary areas for placement of a control push surface of a gain input control with relation to the steering wheel.

With reference to FIG. 16, in various further embodiments, control units 102 may be mounted such that the control push surface 108 of the gain input control 106 is located within an area S directly above each spoke 214 and 216, and has a surface-to-surface separation distance d of at least about 30 mm to allow for adequate clearance of the driver's thumb between the rim 212 of the steering wheel 210 and the gain input control 106.

Figure 17:
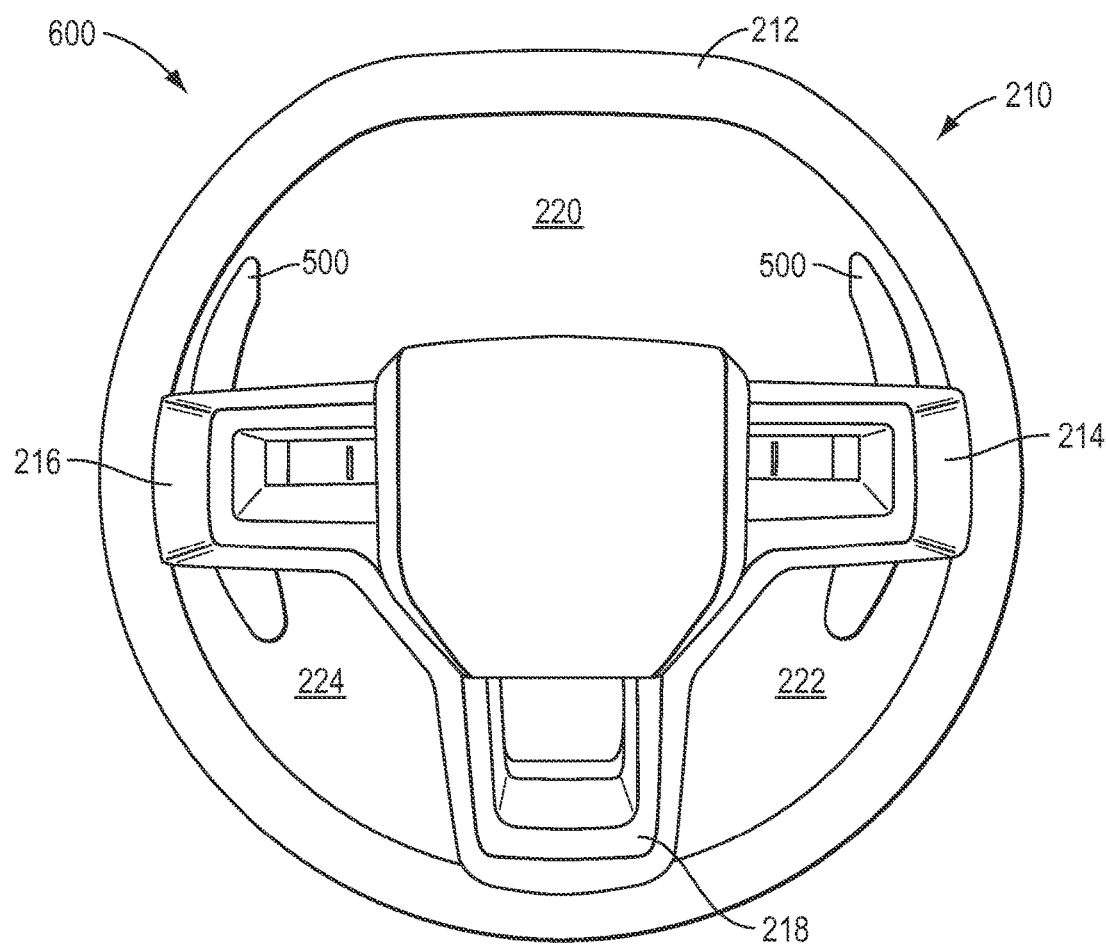
FIG. 17 is a front view of another exemplary embodiment of a trailer brake control system in accordance with the present disclosure.
Figure 18:
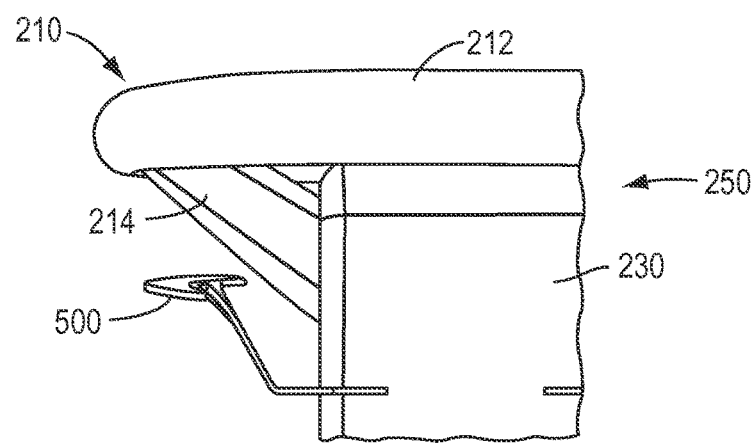
FIG. 18 is a partial top view of the trailer brake control system of FIG. 17.

Those of ordinary skill in the art would understand that the trailer brake control systems described above with reference to the embodiments of FIGS. 6-16 are exemplary only and that trailer brake control systems in accordance with the present disclosure may have various configurations, including various styles of steering wheels 210 having various configurations and/or numbers of spokes 214, 216, and 218. Furthermore, trailer brake control systems in accordance with the present disclosure may have various numbers and/or configurations of controllers 100 mounted to the steering wheel 210 and/or proximate to the steering wheel 210, without departing from the scope of the present disclosure and claims. As illustrated in FIGS. 17 and 18, for example, various additional embodiments of the present disclosure contemplate a trailer brake control system 600 including one or more trailer brake controllers 500, two trailer brake controllers 500 being shown in the exemplary embodiment of FIGS. 17 and 18, that are mounted on a steering column 230 of a steering assembly 250 (which includes the steering wheel 210).

The present disclosure further contemplates methods of manually controlling the electronic wheel brakes of a vehicle being towed (e.g., a trailer) using, for example, the trailer brake controllers 100, 300, 500 and trailer brake control systems 200, 400, and 600 described above. In accordance with various exemplary embodiments, a force may be applied to a brake lever 104 that is mounted, for example, via a control unit 102, to a steering assembly 250 of a motor vehicle. The force may be applied, for example, via movement of a finger associated with a hand of a driver of the motor vehicle, while the driver grips a steering wheel 210 of the assembly 250 with the hand. In various embodiments, for example, the driver may grip the steering wheel 210 between an 8 O'clock and 10 O'clock position and/or a 2 O'clock and 4 O'clock position (see FIG. 13).

In accordance with various embodiments, as illustrated in FIGS. 6-12, the brake lever 104 may be mounted to a spoke of the steering wheel 210, such as, for example, behind the spoke of the steering wheel 210. In various additional embodiments, as illustrated in FIGS. 17 and 18, the brake lever 104 may be mounted to a steering column 230 of the assembly 250. In various embodiments, for example, the brake lever 104 may be coupled to a control unit 102 that is embedded within the steering column 230.

In this manner, as illustrated and described above with reference to FIGS. 7 and 11, a force may be applied to the brake lever 104 by pulling the brake lever 104 in a forward motion F toward the driver of the motor vehicle. In various embodiments, for example, a force of about 1 N to about 15 N may be applied to the brake lever 104 to pull the brake lever 104 forward.

A manual trailer brake control signal may then be generated, for example, by the control unit 102, based on the force applied to the brake lever 104. Finally, the electronic wheel brakes of the vehicle being towed by the motor vehicle may be actuated based on the manual trailer brake control signal.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to trailers that are towed by motor vehicles, such as, passenger vehicles, those of ordinary skill in the art would understand that the present teachings as disclosed would work equally well for any type of towed vehicle having electronic wheel brakes.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A trailer brake controller for a motor vehicle, comprising:
   a control unit configured to be mounted behind a spoke of a steering wheel of the vehicle, such that, when the control unit is mounted behind the spoke, the control unit has a length along a direction substantially perpendicular to the spoke and a width along a direction substantially parallel to the spoke, wherein the length is greater than the width; and
   a brake lever coupled to the control unit and extending along the length of the control unit such that, when the control unit is mounted behind the spoke, the brake lever extends above and/or below the spoke in the direction substantially perpendicular to the spoke,
   wherein the brake lever is configured to transmit a force applied to the lever by a driver to the control unit, and
   wherein the control unit is configured to generate a manual trailer brake control signal based on the force applied to the lever.

2. The trailer brake controller of claim 1, wherein the brake lever extends adjacent to the control unit along a longitudinal axis of the control unit.

3. The trailer brake controller of claim 1, further comprising a gain input control.

4. The trailer brake controller of claim 3, wherein the gain input control is coupled to the brake lever.

5. The trailer brake controller of claim 4, wherein the gain input control is coupled to a top portion of the brake lever such that, when the control unit is mounted behind the spoke of the steering wheel, the gain input control extends above the spoke.

6. The trailer brake controller of claim 1, wherein the manual trailer brake control signal is configured to actuate electronic wheel brakes of a vehicle being towed by the motor vehicle.

7. The trailer brake controller of claim 1, wherein, when the control unit is mounted behind the spoke of the steering wheel, the brake lever is configured to be actuated by a driver of the motor vehicle by being pulled in a forward motion toward the spoke.

8. The trailer brake controller of claim 7, wherein the brake lever comprises a housing that at least partially encloses the control unit and is configured to slide forward with relation to the control unit to transmit the applied force to the control unit when the brake lever is pulled in the forward motion.

9. A trailer brake control system for a motor vehicle, comprising:
   a steering wheel comprising a rim and at least one spoke, the rim and the at least one spoke defining an open area of the steering wheel;
   at least one control unit mounted behind the at least one spoke;
   a brake lever coupled to the at least one control unit and extending above and/or below the at least one spoke to be at least partially visible to a driver of the vehicle through the open area of the steering wheel; and
   a gain input control coupled to a top portion of the brake lever such that the gain input control is visible to the driver of the vehicle through the open area of the steering wheel,
   wherein the at least one control unit is configured to generate a manual trailer brake control signal based on a force applied to the lever by the driver to actuate electronic wheel brakes of a vehicle being towed by the vehicle.

10. The trailer brake control system of claim 9, wherein the at least one control unit is mounted such that the at least one control unit is positioned between a 2 O'clock position and a 4 O'clock position on the steering wheel and/or a 10 O'clock position and an 8 O'clock position on the steering wheel.

11. The trailer brake control system of claim 9, wherein the at least one control unit is mounted to provide a finger clearance area for activation of the lever, wherein the finger clearance area is defined by a first thickness of about 20 mm, a second thickness of about 25 mm, and a length of about 35 mm.

12. The trailer brake control system of claim 9, wherein the brake lever extends adjacent to the at least one control unit along a longitudinal axis of the control unit.

13. The trailer brake control system of claim 9, wherein the at least one control unit is mounted to a steering column of the motor vehicle.

14. The trailer brake control system of claim 9, wherein the steering wheel comprises two spokes positioned on opposite sides of the steering wheel from each other, and wherein the at least one control unit comprises a control unit mounted to each spoke on opposite sides of the steering wheel from each other.

15. The trailer brake control system of claim 9, wherein the gain input control comprises a control push surface, the control push surface being located directly above the at least one spoke within the open area of the steering wheel.

16. The trailer brake control system of claim 15, wherein a surface-to-surface separation distance between the control push surface and the rim of the steering wheel is at least about 30 mm.

17. The trailer brake control system of claim 9, wherein the at least one control unit is mounted to the at least one spoke.

18. A trailer brake control system for a motor vehicle, comprising:
   a steering wheel comprising a rim and at least one spoke, the rim and the at least one spoke defining an open area of the steering wheel;
   at least one control unit embedded within the at least one spoke; and
   a brake lever coupled to the at least one control unit and extending above and/or below the at least one spoke to be at least partially visible to a driver of the vehicle through the open area of the steering wheel;
   wherein the at least one control unit is configured to generate a manual trailer brake control signal based on a force applied to the lever by the driver to actuate electronic wheel brakes of a vehicle being towed by the vehicle.

19. The trailer brake control system of claim 18, wherein the brake lever comprises a housing that at least partially encloses the control unit and is configured to slide forward with relation to the control unit to transmit the applied force to the control unit when the brake lever is pulled in a forward motion toward the at least one spoke.

* * * * *